(12) United States Patent  
Rudell et al.

(10) Patent No.: US 7,594,349 B2  
(45) Date of Patent: Sep. 29, 2009

(54) EDGE ANIMATION MULTIPLE IMAGE DISPLAY DEVICE

(75) Inventors: Elliot Rudell, 1619 Gramercy Ave., Torrance, CA (US) 90501; Roger Gardner, Lomita, CA (US)

(73) Assignee: Elliot Rudell, Torrance, CA (US)

( * ) Notice: Subject to any disclaimer, the term of this patent is extended or adjusted under 35 U.S.C. 154(b) by 255 days.

(21) Appl. No.: 11/708,920

(22) Filed: Feb. 20, 2007

(65) Prior Publication Data

US 2008/0196286 A1   Aug. 21, 2008

(51) Int. Cl.
*G09F 19/14* (2006.01)
*F21V 7/04* (2006.01)

(52) U.S. Cl. .................. 40/453; 362/616; 362/613; 446/47

(58) Field of Classification Search .............. 362/602, 362/600, 616, 613, 632; 40/453; 472/61; 446/47, 91, 242, 485

See application file for complete search history.

(56) References Cited

U.S. PATENT DOCUMENTS

| 4,948,489 | A | * | 8/1990 | Greenberg ............... 204/228.6 |
| 4,949,489 | A |   | 8/1990 | Rudell et al. |
| 5,743,616 | A | * | 4/1998 | Giuliano et al. ............. 362/612 |
| 7,286,193 | B2 | * | 10/2007 | Yoo et al. ..................... 349/62 |
| 2005/0083673 | A1 | * | 4/2005 | Braun ......................... 362/31 |
| 2006/0207134 | A1 |  | 9/2006 | Harry |

* cited by examiner

*Primary Examiner*—Ali Alavi
(74) *Attorney, Agent, or Firm*—Ben J. Yorks; Irell & Manella LLP

(57) ABSTRACT

A toy device unit that includes a pair of stacked transparent plates coupled to a housing. A user can write images on each plate. Mounted to the housing is a first light source aligned with an edge of the first plate and a second light source aligned with an edge of the second plate. The unit has a switch that can be moved by a user to illuminate either the first plate or the second plate.

20 Claims, 3 Drawing Sheets

EDGE ANIMATION MULTIPLE IMAGE DISPLAY DEVICE

BACKGROUND OF THE INVENTION

1. Field of the Invention

The present invention relates to a toy drawing device.

2. Prior Art

U.S. Pat. No. 4,949,489 issued to Rudell et al. discloses a toy drawing device. The Rudell device includes a pair of stacked plates that are attached to a housing. The stacked plates can be illuminated with light traveling by internal reflection through the plates. The housing includes a light source and a blind that can be rotated to block light from entering the edge of one of the plates, so that the other plate is illuminated.

The user can draw one image on one plate and another image on the other plate. One of the plates can be illuminated to view the corresponding image. The blind can be rotated back and forth to alternate illumination of the plates and viewing of the images. Rotating the blind to illuminate one of the plates requires either manual or motorized movement of the blind. Manual movement necessitates a certain amount of skill to align the blind with an edge of a plate. This problem can be alleviated by motorized movement, but motors tend to become inoperable over time. Additionally, motors limit the life of batteries used to power the system.

The light source described in the Rudell patent is a fluorescent bulb, or an incandescent bulb, located within the housing. To properly view the illuminated images of one plate, the unit has to be operated in a dark room. The requirement for a dark room limits the usefulness of the toy. It would be desirable to provide a toy drawing unit that does not require moving parts or a dark room.

Furthermore, the employment of the moving blind to alternately direct the light source onto one of the multiple plates required that the light source itself be distanced from the edge of the plates, further diminishing luminosity.

BRIEF SUMMARY OF THE INVENTION

A toy drawing unit that includes first and second transparent plates coupled to a housing. The unit includes a first light source aligned with an edge of the first plate and a second light source aligned with an edge of the second plate. The light sources are coupled to a switch that can alternately illuminate either the first or second plates.

DETAILED DESCRIPTION

Disclosed is a toy drawing device that includes a pair of stacked transparent plates coupled to a housing. A user can write images on each plate. Mounted to the housing is a first light source aligned with an edge of the first plate and a second light source aligned with an edge of the second plate. The unit has a switch that can alternately illuminate either the first plate or the second plate.

Figure 1:
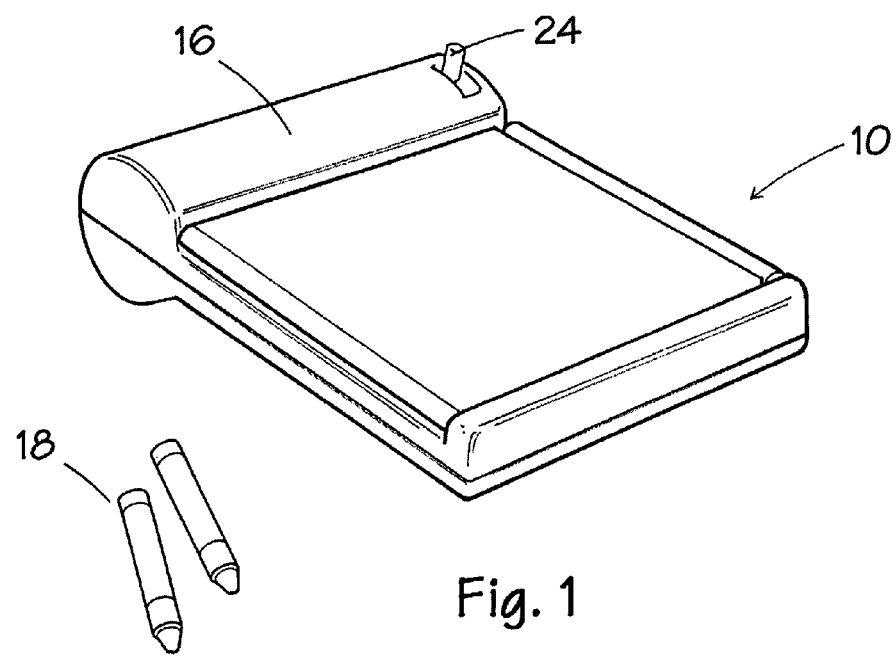
FIG. 1 is an illustration of a toy drawing unit.
Figure 2:
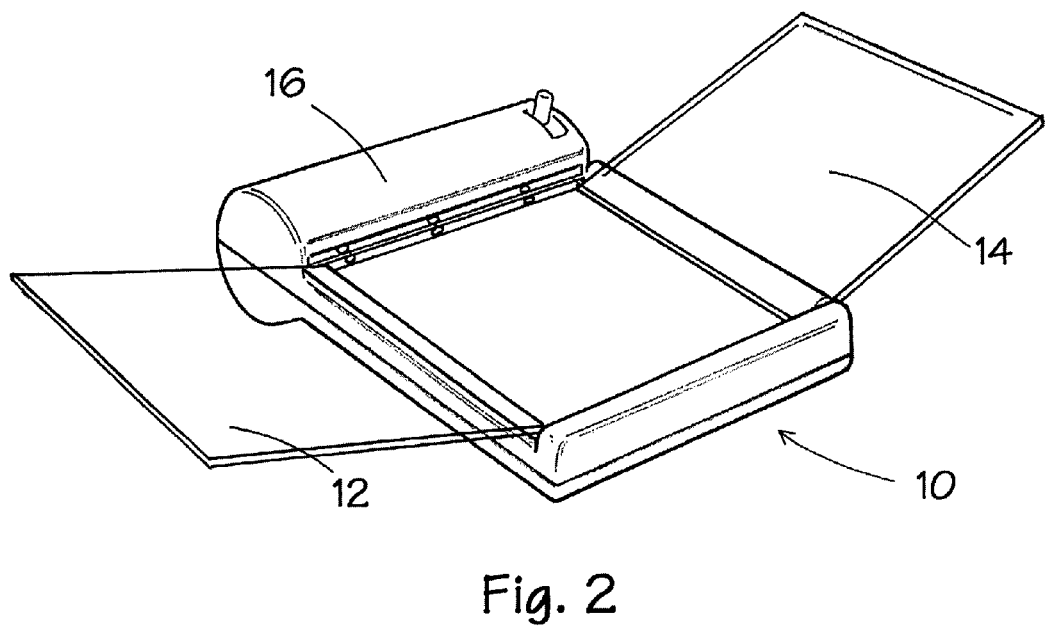
FIG. 2 is an illustration showing a pair of plates rotated to an open position.
Figure 3:
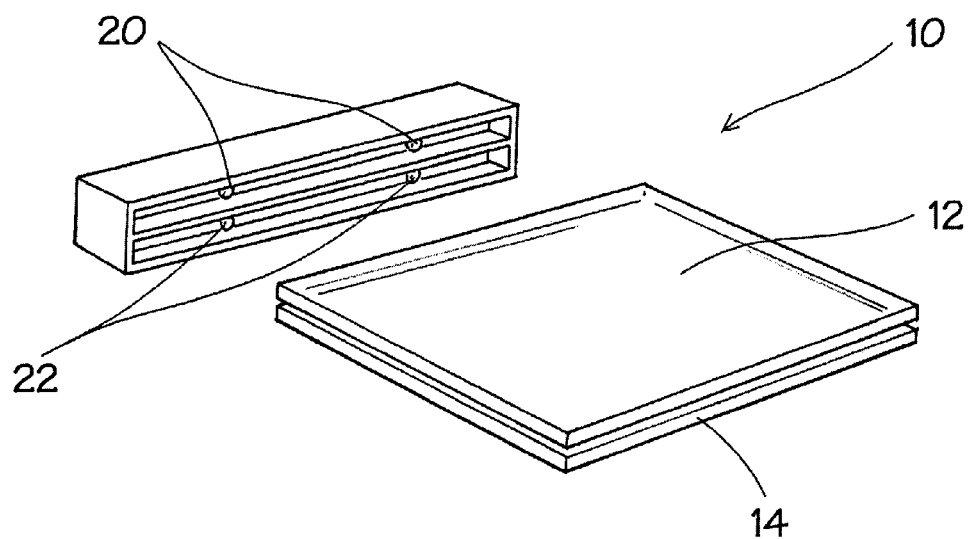
FIG. 3 is an illustration showing a perspective view of the plates and a housing with light sources.

Referring to the drawings more particularly by reference numbers, FIGS. 1, 2 and 3 show an embodiment of a toy drawing device 10. The device 10 includes a first transparent plate 12 and a second transparent plate 14 coupled to a housing 16. The transparent plates 12 and 14 can be pivotally coupled to the housing 16 so that the plates 12 and 14 can be rotated between open and closed positions. Additionally, the plates 12 and 14 may be removed entirely from the housing 16.

The plates 12 and 14 are preferably constructed from a clear plastic material such as an acrylic. The housing 16 can be constructed from a molded plastic material such as high impact styrene. A writing instrument 18 such as a type of crayon can be used to draw images on the plates 12 and 14. The first plate 12 can be rotated into an open position to allow the user to draw an image on the second plate 14. Alternatively, the plates can be removed from the housing 16 for drawing, and then replaced into the housing.

The unit 10 includes a first light source 20 and a second light source 22 that are mounted to the housing 16. The first light source 20 may be a row of "bright" light emitting diodes ("LEDs"). Likewise, the second light source 22 may be a row of bright LEDs. Alternatively, the light sources 20 and 22 may be positioned around more than one edge of each plate.

Figure 4:
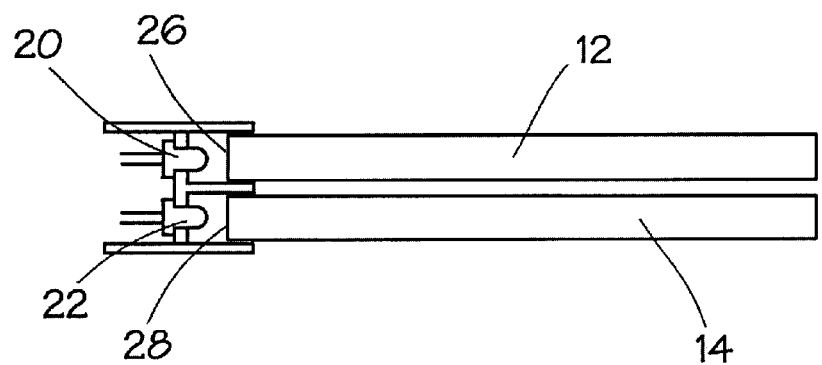
FIG. 4 is an illustration showing a side view of the plates aligned with the light sources.

The housing 16 holds a switch 24 that can be moved by a user to illuminate either the first light source 20 of the second light source 22. As shown in FIG. 4, the first light source 20 is aligned with an edge 26 of the first plate 12, and in close proximity to said edge. The second light source 22 is aligned with an edge 28 of the second plate 14, and in close proximity with said edge.

Figure 5:
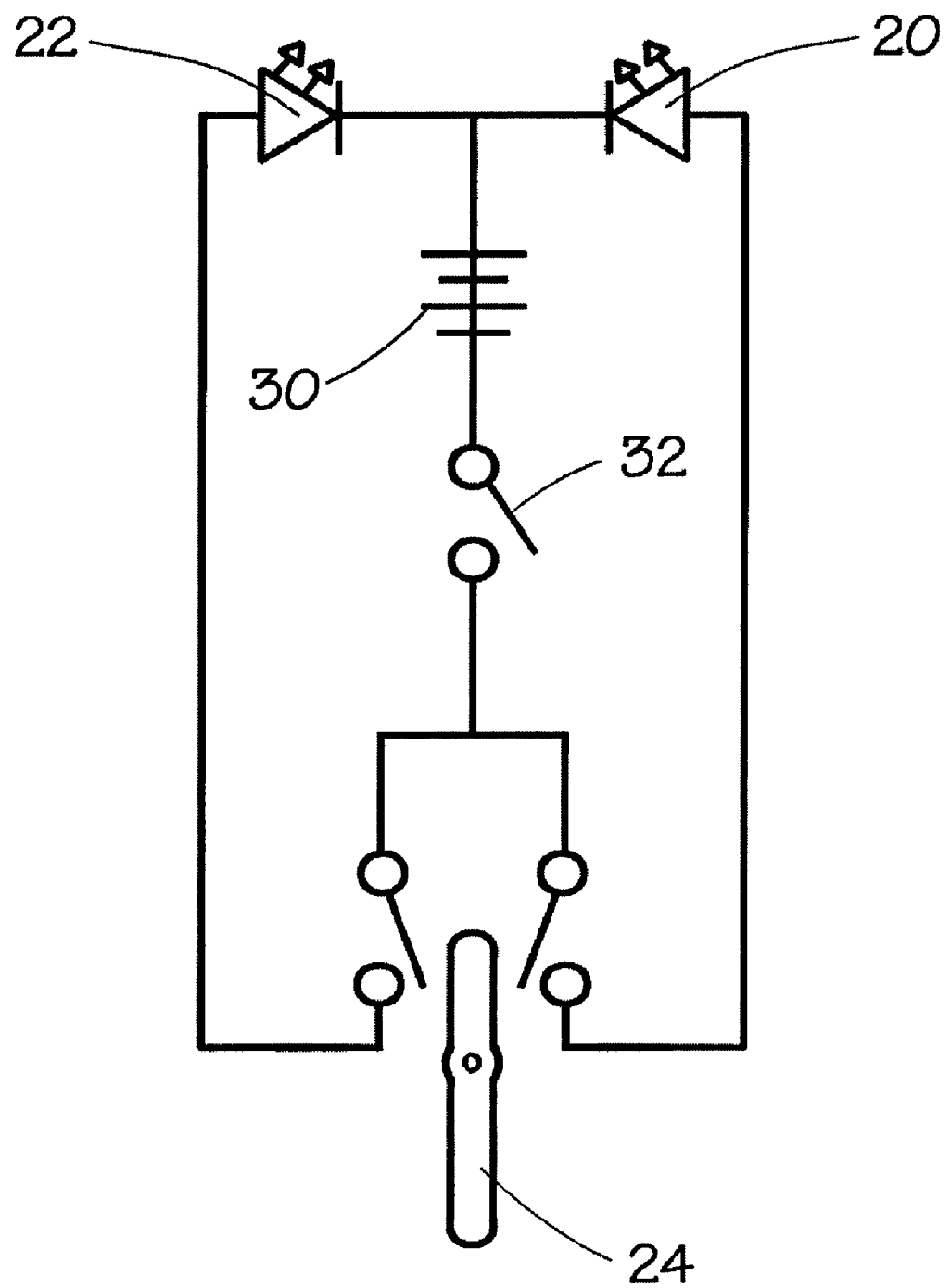
FIG. 5 is a schematic of an electrical circuit of the unit.

FIG. 5 shows a schematic of an electrical circuit of the device. The circuit includes a battery(ies) 30 that provides power to the light sources 20 and 22. The device may have an ON/OFF switch 32. Movement of the switch 24 into a first position will allow current to flow to the first light source 22. Movement of the switch 24 to a second position will allow current to flow to the second light source 20.

To operate the toy, a user can write an image on the first plate 12, rotate the plate and write another image on the second plate 14. The two images may be a sequence of scenes. For example, the first plate image may depict a character with arms in one position, the second plate depicts the same character with arms in a different position.

The user can then move the switch 24 between the first and second positions to sequentially illuminate the first and second plates, providing the illusion that the character is moving its arms. The integration of bright LEDs allows the unit to be used in an environment that is not totally dark. The elimination of moving parts or motorized mechanisms to select illumination of the plates simplifies the use and life of the device, especially as it applies to children's usage, where droppage is inevitable.

It should also be noted that the switch 24 can be replaced by an automatic switch that automatically switches between states to first illuminate the light array for the first plate, and then illuminates the light for the second plate, followed by re-illumination of the lights for the first plate. Such automatic switching provides a means whereby the invention could be utilized as a message board or animated menu board, without constant manual switching required.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A toy drawing device, comprising:
   a housing;
   a first transparent plate that is coupled to said housing and has an edge;
   a second transparent plate that is coupled to said housing and has an edge;
   a first light source mounted to said housing and aligned with said edge of said first transparent plate;
   a second light source mounted to said housing and aligned with said edge of said second transparent plate; and,
   a switch coupled to said first and second light sources.

2. The device of claim 1, wherein said switch causes illumination of either said first transparent plate or said second transparent plate.

3. The device of claim 1, wherein said first and second light sources include light emitting diodes.

4. The device of claim 1, wherein said first and second transparent plates are pivotally attached to said housing.

5. The device of claim 1, further comprising a writing instrument to write on said first and second transparent plates.

6. The device of claim 1, wherein said first and second transparent plates are essentially parallel to each other.

7. The device of claim 1, wherein said first light source includes a row of light sources and said second light source includes a row of light sources.

8. A method for operating a toy drawing device, comprising:
   moving a switch to a first position to illuminate a first transparent plate with a first light source; and,
   moving the switch to a second position to illuminate a second transparent plate with a second light source.

9. The method of claim 8, further comprising moving the first and second transparent plates relative to a housing that holds the first and second light sources.

10. The method of claim 8, further comprising writing on the first transparent plate and the second transparent plate.

11. A toy drawing device, comprising:
    a housing;
    a first transparent plate that is coupled to said housing and has an edge;
    a second transparent plate that is coupled to said housing and has an edge;
    a first light source mounted to said housing and aligned with said edge of said first transparent plate;
    a second light source mounted to said housing and aligned with said edge of said second transparent plate; and,
    a circuit that allows said first and second light sources to be alternatively turned on and off.

12. The device of claim 11, wherein said circuit includes a switch that causes illumination of either said first transparent plate or said second transparent plate.

13. The device of claim 11, wherein said first and second light sources include light emitting diodes.

14. The device of claim 11, wherein said first and second transparent plates are pivotally attached to said housing.

15. The device of claim 11, further comprising a writing instrument to write on said first and second transparent plates.

16. The device of claim 11, wherein said first and second transparent plates are essentially parallel to each other.

17. The device of claim 11, wherein said first light source includes a row of light sources and said second light source includes a row of light sources.

18. A method for operating a toy drawing device, comprising:
    operating a circuit to illuminate a first transparent plate with a first light source; and,
    operating the circuit to illuminate a second transparent plate with a second light source.

19. The method of claim 18, further comprising moving the first and second transparent plates relative to a housing that holds the first and second light sources.

20. The method of claim 18, further comprising writing on the first transparent plate and the second transparent plate.

* * * * *